Hyatt & Meyer,
Making Rubber Soles,
N° 10,429.                    Patented Jan. 17, 1854.
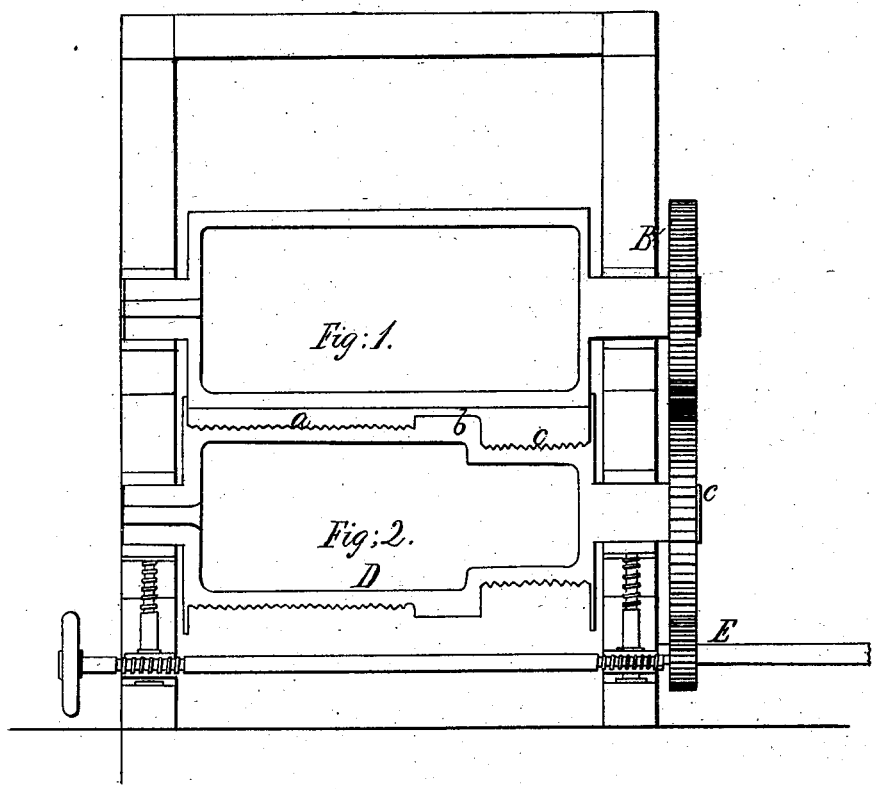

UNITED STATES PATENT OFFICE.

ELIAS CHAMPION HYATT AND CHRISTOPHER MEYER, OF MILLTOWN, NEW JERSEY.

MANUFACTURE OF BOOT AND SHOE SOLES OF GUTTA-PERCHA OR INDIA-RUBBER.

Specification of Letters Patent No. 10,429, dated January 17, 1854.

*To all whom it may concern:*

Be it known that we, ELIAS CHAMPION HYATT and CHRISTOPHER MEYER, of Milltown, in the county of Middlesex, State of New Jersey, have invented a new and Improved Mode of Making the Soling of India-Rubber and Gutta-Percha Shoes and Boots, and that the following is a full, clear, and exact description of the same.

By reference to the drawings it will be seen that our machine consists of two rollers, marked No. 1 and No. 2. No. 1 is a smooth roller which is fixed in bearings in the frame A, A, A. D represents another roller, which in connection with the upper roller forms or makes the soling, and which is called the soling roller. This roller as will be seen has three distinct circumferences *a, b, c,* which produce three different thicknesses of the sole, and may be composed of a single roller, or three separate rollers.

The process of making the soling is as follows: The india rubber or gutta percha in a soft state is passed between the rollers No. 1 and No. 2, in a continuous sheet, the rollers being heated by steam, which keeps the india rubber in a soft and pliable state, the upper roller or calender No. 1, being a plain smooth roller, composed of the same material as the lower (which may be of iron or any suitable metal) and produces a smooth surface on the upper side of the soling as it passes between the rollers. The under surface is formed by the roller No. 2, which, as we have previously stated, is divided into three distinct circumferences which by this means produce corresponding thicknesses in the india rubber or gutta percha, as it passes between this and the upper roller No. 1, *a* forming the fore part, *b* the shank, and *c* the heel, thus performing in one operation what had previously been done in three distinct processes, and with the further advantage that the soling is formed in one continuous sheet instead of separate short pieces, as was previously done, effecting a great saving of time, expense and labor.

The thickness of the soling may be increased or decreased at pleasure by raising or lowering the roller No. 2 by means of screws set under the bearings of the roller No. 2. By turning them the space between the rollers may be increased or decreased as desired. These rollers are driven by means of the spur wheels —B—C— geared into each other, and driven by the pinion —D— or by a band, or any common mechanical means. As we before observed they can be heated by steam. Coals also can be used or other means that will effect the purpose of preserving or rendering the india rubber or gutta percha soft or pliable while it is passing between them and being formed into soling.

Heretofore india rubber soling has been made of one strip of equal thickness throughout or by several strips of different thicknesses for heel, shank, and fore part cemented together at their ends, or of one strip having the length and breadth of the sole, with separate pieces cemented thereon to give proper thickness to the heel and fore part of the sole. It is at once evident that the first is an inferior sole, and requires more material than the others, and that the second and third require additional labor in the manufacture, and that the parts are liable to become separated in the process of manufacture, or afterward, causing loss to the manufacturer or consumer. It is equally obvious that all these inconveniences and imperfections are avoided by making the sole in one piece, as above described, by our process, and that such sole is thus produced, at once better and cheaper than heretofore.

We are aware that india rubber has long since been reduced to sheets by rolling, and that the rollers used for this purpose have sometimes been engraved to produce a figured surface, analogous to that often cemented to the heels and fore parts of shoes, but these sheets have been of substantially uniform thickness, varying only in the slight indentations, &c., required to produce an ornamental or figured surface. This we do not claim. But we are not aware that india-rubber has ever been rolled into sheets having a substantial variety of thickness in its different parts, nor are we aware that shoe soles, having the proper variety of thickness have ever been rolled out or made in one solid piece before our invention, nor was it known that such forms could be produced as we have produced them, in india rubber until our experiments practically illustrated the fact.

What we claim therefore as our inven- tion, and desire to secure by Letters Patent is—

1. Producing a shoe sole or other analogous manufacture, in india rubber or gutta percha in one piece having variety of thickness in its different parts, by the use of rollers whose surfaces present the reverse of the forms to be produced, at a single operation substantially as herein described.

2. Forming soling of india rubber, or gutta percha, with shanks, fore-parts and heels of appropriate differences of thickness, in one solid piece and at one operation, as described, thus producing a useful, economical and novel manufacture.

3. We also claim forming such soling or analogous manufacture in continuous shets at one operation by rolling as described.

ELIAS CHAMPION HYATT.
CHRISTOPHER MEYER.

Witnesses:
T. STUYVESANT,
ALLAN M. GRIFFEN.